March 14, 1933.  A. MESSER  1,901,254
CUTTING MECHANISM
Filed April 19, 1932  2 Sheets-Sheet 1

INVENTOR
Adolf Messer
BY
ATTORNEYS

March 14, 1933.  A. MESSER  1,901,254
CUTTING MECHANISM
Filed April 19, 1932   2 Sheets-Sheet 2
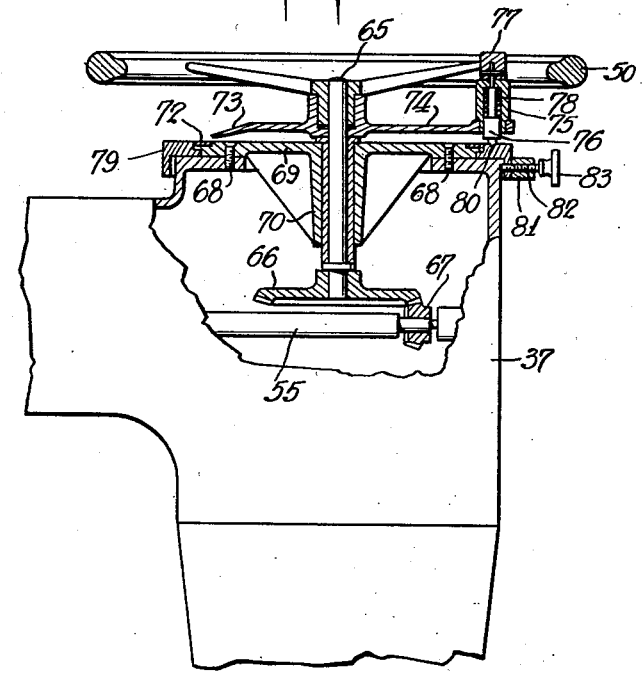
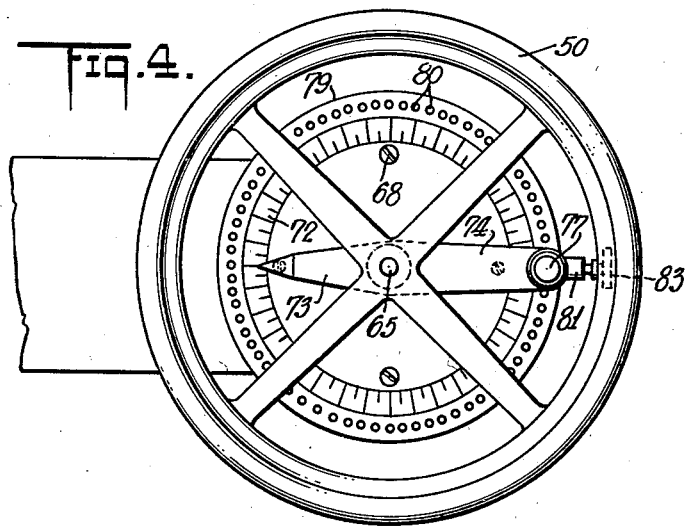
INVENTOR
Adolf Messer
BY
ATTORNEYS Patented Mar. 14, 1933

1,901,254

UNITED STATES PATENT OFFICE

ADOLF MESSER, OF FRANKFORT-ON-THE-MAIN, GERMANY

CUTTING MECHANISM

Application filed April 19, 1932, Serial No. 606,274, and in Germany May 1, 1931.

The invention relates to power driven oxygen jet cutting apparatus for cutting metal, and particularly to new and improved means for controlling the movements of such apparatus.

In apparatus of this general character heretofore used, the torch has been moved by a motor driven tracer or traction wheel guided along the lines of a drawing or template, the movement of this wheel being transmitted to the torch by various means, such for instance as a pantographic connection, a carriage, a link, or the like.

In the operation of these machines, the operator must concentrate his attention on the tracer, and therefore he cannot give the necessary attention to the operation of the torch. Furthermore, all of these machines require drawings or templates for cutting irregular shapes, and the operator therefore is not in a position to regulate the width of the cut made by his torch when following the irregular lines of the drawing or template.

It has been proposed to provide a power driven portable cutter adapted to be supported upon the work at one point only, and to be guided by hand by means of a handle attached to the frame structure of the apparatus. In this type of apparatus, the operator supports the apparatus in an upright position while guiding the same. Such portable apparatus is necessarily very heavy and cannot therefore be firmly supported by hand, and vibrations set up by the operation of the motor may cause the whole apparatus to vibrate and to make the burning of regular and even cuts difficult. Furthermore, the apparatus may slip on the work during its operation.

One object of the present invention is to provide a power driven cutting apparatus which is supported during operation without the aid of an operator, and which is guided by means manually operable from a point closely adjacent to the torch. Thus the movement of the torch may be controlled by direct observation by the operator, of the lines on the work and along which the cut is to be made. The operator does not support the apparatus, and therefore can concentrate his attention on the guiding of it. By means of this arrangement, the use of drawings may be eliminated, and a clean cut made in accordance with the contours of a design laid out directly on the work to be cut.

Another object of the present invention is to provide a power driven oxygen jet cutting apparatus which may be suitably supported during operation without the aid of the operator, and which may be adjusted to make straight line cuts without the necessity of hand guidance.

Still another object is to provide a power driven apparatus which may be suitably supported, and which is provided with guiding means having a series of calibrations whereby the direction of movement of the torch may be set for any angle, or changed at will to any accurately determined extent.

In the accompanying drawings, there are shown, for purposes of illustration, two forms of a device embodying the present invention. In these drawings Fig. 1 is a side elevation, partly in section, of an apparatus embodying the present invention.

Fig. 3 is a side elevation, partly in section, of another form of guiding mechanism, and Fig. 4 is a top plan view of the mechanism shown in Fig. 3.

Figure 1:
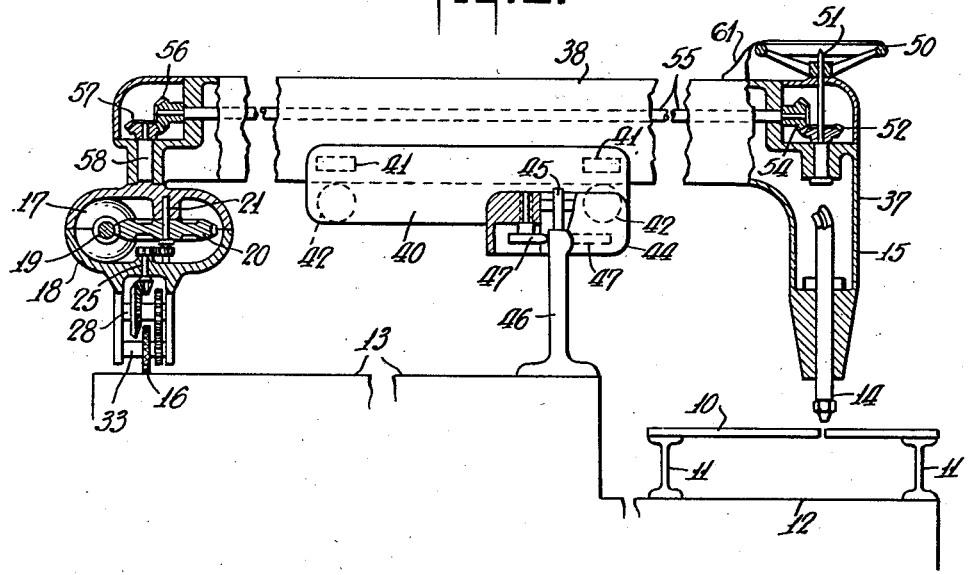
Figure 2:
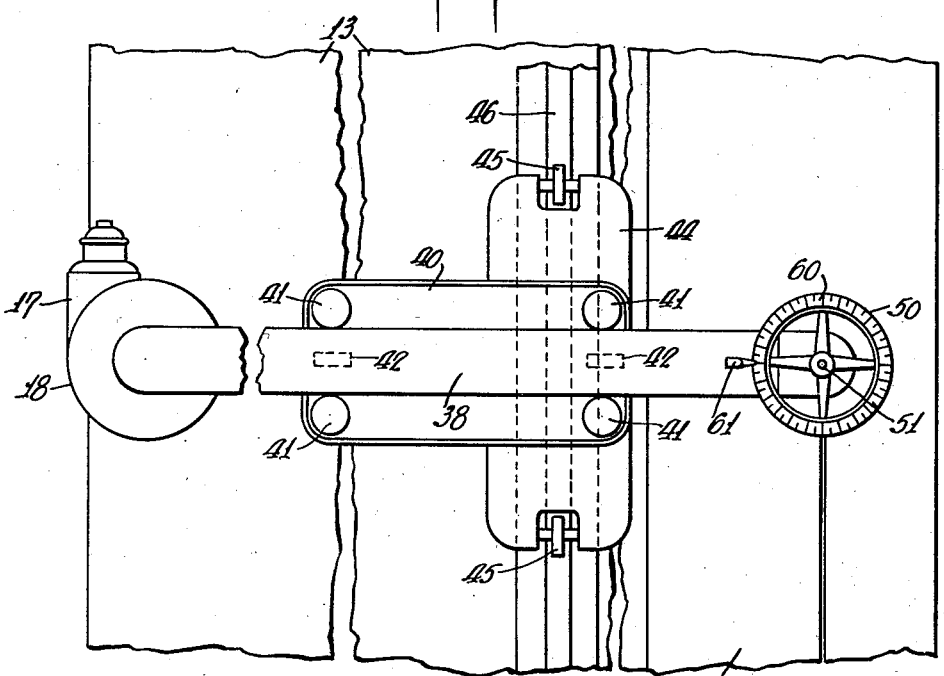
Fig. 2 is a top plan view of the apparatus shown in Fig. 1.

In the specific form shown in Figs. 1 and 2, a plate 10 may constitute the work to be operated upon. This plate may be supported in any suitable manner, for instance by two beams 11 resting on a floor or surface 12. The torch for cutting the plate 10 is shown supported on the surface or floor 13 preferably at a higher elevation than the floor 12.

The apparatus includes a cutting torch 14 of any suitable oxygen jet type suitably supported in a movable frame structure 15 and supplied with the necessary gas connections. The frame structure 15 carries traction or motor driven means including a traction wheel 16 constituting one of the supports for the apparatus, and adapted to ride over the floor 13 and move the torch over the work 10 to be cut. This traction wheel 16 is driven by a motor 17 enclosed or mounted on a casing 18 supporting the frame structure 15. A speed reducing gearing is provided between the shaft of the motor 17 and the traction wheel 16 for driving said wheel and propelling the torch. This gearing, in the specific form shown, includes a worm 19 connected to the shaft of the motor 17, and meshing with a worm wheel 20 mounted on a shaft 21 journalled in the casing 18. The shaft 21 drives a second shaft 25 through gear wheels, and the shaft 25 drives a shaft 28 through a bevel gear. The traction wheel 16 is mounted on a shaft 33 which is driven from the shaft 25 by suitable gears.

The frame structure 15 terminates in a headpiece 37 which supports the torch 14. This headpiece is connected to the traction means by an arm 38 which is so supported that it may move endwise as well as sidewise in accordance with the direction of movement of the traction wheel. In the specific form shown, the support for the arm 38 includes a supporting carriage part 40 provided with a channel to receive the lower part of the arm 38. This carriage part 40 carries two pairs of rollers 41 disposed on opposite sides of the arm 38 to guide the endwise movement of this arm. The lower portion of the carriage part 40 is provided with rollers 42 upon which the arm 38 rides in its endwise movement.

In order to permit the movement of the arm 38 transversely with respect to its length, the carriage part 40 is supported upon a carriage body 44 which carries at the ends thereof rollers 45 which ride along a beam 46 supported on the floor 13. This carriage 44 may be guided against side movement in respect to the rail 46 by suitable means, as for instance freely rotatable guide rollers 47 engaging the sides of the beam 46. Thus the arm 38 and the torch may move lengthwise or transversely in respect to the rail or track 46.

It is seen therefore that the apparatus is provided with two spaced supports whereby said apparatus may be operated without being held up by hand. One of these supports comprises the traction wheel 16 and the other support comprises the bed 40, carriage 44 and track 46.

As an important feature of the present invention, a steering or guiding means is disposed in close proximity to the torch 14, for instance on the headpiece 37 of the frame structure 15. In the specific form shown, this includes a steering hand wheel 50 disposed substantially over the torch 14, and advantageously having the axis thereof extending in the same general direction as the torch 14. Motion is transmitted to the traction wheel 16 from the steering wheel 50, whereby the rotation of the steering wheel causes the corresponding movement of the traction wheel about a vertical axis. As shown, the steering wheel 50 is connected to the upper part of a spindle 51 journalled in the upper portion of the headpiece 37, and carrying on the lower end thereof a bevel gear 52 journalled inside of said headpiece 37. This bevel gear 52 meshes with a bevel gear 54 on one end of a shaft 55 extending lengthwise of the arm 38 which is hollow. The other end of the shaft 55 carries a bevel gear 56 which meshes with a bevel gear 57 connected to a vertical shaft 58 connected at its lower end to the casing 18. Therefore, when the steering wheel 50 is rotated, the casing 18 is correspondingly rotated to skew the traction wheel 16 so that the direction of movement of the torch 14 is correspondingly changed. If the traction wheel travels parallel to the track, the carriage bed will move along the track, but if the traction wheel moves at an angle to the track, the arm will slide in the carriage and the latter will also move along the track.

As another feature of the present invention, calibrated means are provided, whereby the direction of movement of the torch 14 may be accurately determined and may be changed to any selected angle by setting the steering means in accordance with the desired angle, as indicated on the scale. For that purpose, the hand wheel 50 has an annular scale 60 movable in respect to a pointer 61 mounted on the arm 38. The scale 60 may be calibrated to read directly in angles.

In Figs. 3 and 4 is shown another form of steering mechanism in which the hand wheel may be locked in any position in order to insure the straight line movement of the torch 14. In this construction, the hand wheel 50 is connected to the upper end of a spindle 65 carrying at its lower end a bevel gear 66 meshing with a gear 67 connected to one end of the shaft 55.

Connected to the upper end of the headpiece 37 by any suitable means, as for instance screws 68, is a disk 69 having a hub portion 70 journalled on the spindle 65.

Connected to the disk 69 is an angular ring 72 calibrated to read directly in angles. Adjacent to the scale of this ring 72 is a pointer 73 connected to the hub of the steering wheel 50. By turning the wheel 50 in accordance with the desired angle, as indicated by the movement of the pointer 73 over the scale of the ring 72, the direction of movement of the torch 14 will be changed to a corresponding amount.

In order to lock the steering wheel 50 in any selective position to insure the straight line movement of the torch 14 in any selected direction, the hub of the pointer 73 has radially extending therefrom an arm 74 which may be integral with the pointer 73, and which carries at the outer end thereof a guide bushing 75 in which is slidably mounted a spring loaded bolt 76. The upper end of the bolt has a knob 77 whereby said bolt may be lifted against the action of a spring 78.

Encircling the disk 69 is a ring 79 which is free to rotate and which is provided with an annular series of apertures 80 adapted to receive the bolt 76. By lifting the knob 77, the steering wheel 50 may be turned with respect to the ring 79, and when any selective position of the steering wheel 50 is reached, the knob 77 may be released to permit the bolt 76 to engage the nearest aperture 80. The ring 79 may be locked with respect to the headpiece 37 by any suitable means, as for instance a screw 82 mounted in a boss 81 connected to one side of the ring 79, and provided with a knob 83 by means of which said screw may be turned. The inner end of the screw is disposed adjacent to the outside of the headpiece 37 so that it may be forced into engagement therewith. By means of this arrangement, the ring 79 may be locked in any selected position.

In the operation of this particular type of steering mechanism, the hand wheel 50 may be turned until the pointer registers with the desired point on the scale, and the ring 79 will be turned at the same time and to the same extent by reason of the engagement of the bolt 76 with said ring. The hand wheel may then be locked in this position by the set screw 82.

Having thus described my invention, what I claim as new and desire to secure by Letters Patent is:—

1. A cutting apparatus having a frame structure, a pair of spaced supports therefor, a torch on said frame structure, power driven means remote from the torch for moving said frame structure and said torch along the work, and means manually operable from a point close to said torch for guiding said torch.

2. A cutting apparatus including a frame structure, a torch on said frame structure, a pair of supports including a traction wheel, power driven means for rotating said wheel to move said torch, and a steering hand wheel for guiding said traction wheel, and having the axis thereof extending in the same general direction as said torch, and in close proximity thereto.

3. A cutting apparatus including a frame structure having a pair of spaced supports, a torch on said frame structure, means for moving said frame structure to move said torch along the work to be cut, and means for steering said torch, and including a steering member rotatable with respect to said frame structure and disposed in close proximity to said torch, whereby the operator may guide the apparatus by direct observance of the work.

4. A cutting apparatus having a frame for carrying a torch, a pair of supports for said frame, one of said supports including a traction wheel, power means for rotating said traction wheel to move said torch along the work to be cut, and means manually operable from a point close to said torch, for steering said wheel.

5. A cutting apparatus including a frame for carrying a torch, said frame having a pair of spaced supports, power driven means for moving said frame and thereby said torch along the work to be cut, a rotatable steering member disposed in close proximity to said torch for guiding the latter, and means for locking said steering member in selected position, whereby said torch is made to travel in a predetermined direction.

6. A cutting apparatus including a frame structure, a support therefor intermediate the ends thereof, and permitting lateral and endwise movement, a second support for said structure near one end thereof, a torch carried by said frame structure near the other end thereof, power driven means for moving said frame structure to move said torch along the work to be cut, and means manually operable from a point close to said torch, for steering said torch.

7. A cutting apparatus including an arm, a supporting carriage intermediate its ends, a traction wheel for supporting one end of said arm, power means for driving said traction wheel, a torch carried by the other end of said arm, and means manually operable from a point close to said torch for steering said traction wheel.

8. A cutting apparatus having a movable guide carriage, a frame member slidable thereon, a torch on said frame member, power driven means for moving said frame member to move said torch along the work to be cut, and means manually operable from a point close to said torch for steering said torch.

9. A cutting apparatus including a frame structure, a traction wheel for supporting said frame structure, power means for driving said traction wheel, a carriage for supporting said frame structure spaced from said traction wheel, a torch on said frame structure, and means manually operable from a point close to said torch, for steering said traction wheel, whereby the operator may guide the apparatus by direct observance of the work.

10. A cutting apparatus including an arm disposed in substantially horizontal position, a traction wheel for supporting one end of said arm, means for driving said traction wheel, a torch carried by said arm near the other end thereof, a support for said arm intermediate the ends thereof and permitting endwise and transverse movement of said arm, and means manually operable from a point close to said torch for steering said traction wheel.

11. A cutter apparatus including a substantially horizontal arm, a motor having a support pivotally connected to said arm near one end thereof, a traction wheel driven by said motor, and adapted to ride over a supporting surface, a torch carried by said arm near the other end thereof, a steering member disposed in close proximity to said torch, a driving connection between said steering member and said motor support, for directing said traction wheel, and a support for said arm intermediate the ends thereof, and permitting endwise and lateral movement of said arm.

12. A cutting apparatus including a frame for carrying a torch, a pair of spaced supports therefor permitting bodily movement of the frame, power driven means for moving the frame, a rotatable steering member disposed in close proximity to said torch for steering said torch, and a scale cooperating with said rotatable member, and graduated in angles, whereby the direction of movement of the torch may be determined.

13. A cutting apparatus including a frame structure, a traction wheel for supporting said frame structure, means for driving said traction wheel, a second support for said frame structure spaced from said traction wheel, said frame structure being movable with respect to said second support, and both of said supports being adapted to move in respect to a supporting surface, a torch, carried by said frame structure, and means manually operable from a point close to said torch for steering said traction wheel.

14. A cutting apparatus including a carriage, a track therefor, an arm carried by said carriage and movable in respect thereto transversely of said carriage, a torch carried by the arm at one end, a traction wheel for moving the opposite end, and a hand wheel at said first mentioned end of the arm for guiding said traction wheel.

15. A cutting apparatus including a torch, a track, a carriage movable along the same, a frame carried by the carriage and slidable in respect thereto transversely of the track, a torch carried by the frame at one end, a motor driven traction wheel at the other end of the frame for moving it and the torch, and means adjacent to the torch for steering the traction wheel.

Signed this 5th day of April, A. D. 1932.

ADOLF MESSER.